(12) United States Patent
Dörfler et al.

(10) Patent No.: US 11,073,219 B2
(45) Date of Patent: *Jul. 27, 2021

(54) ACTUATOR FOR A PNEUMATIC VALVE, VALVE ELEMENT, VALVE ASSEMBLY AND PUMP

(71) Applicant: Alfmeier Präzision SE, Treuchtlingen (DE)

(72) Inventors: Erich Dörfler, Landsberg (DE); Ronny Gehlmann, Allersberg (DE); Helmut Auernhammer, Höttingen (DE); Matthias Mitzler, Graben (DE)

(73) Assignee: Alfmeier Präzision SE, Treuchtlingen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/413,805

(22) Filed: May 16, 2019

(65) Prior Publication Data
US 2019/0353270 A1 Nov. 21, 2019

(30) Foreign Application Priority Data
May 18, 2018 (DE) ..................... 10 2018 112 089.3

(51) Int. Cl.
*F16K 31/02* (2006.01)
*F03G 7/06* (2006.01)
*B60N 2/90* (2018.01)

(52) U.S. Cl.
CPC ............... *F16K 31/02* (2013.01); *B60N 2/99* (2018.02); *F03G 7/065* (2013.01)

(58) Field of Classification Search
CPC .. F16K 31/002; F16K 31/025; F16K 99/0038; F16K 31/02; B60N 2/914; B60N 2/976; B60N 2/665
See application file for complete search history.

(56) References Cited

U.S. PATENT DOCUMENTS 3,442,483 A * 5/1969 Schwartz ........... G05D 23/1921
251/11
4,494,692 A * 1/1985 Dobias .................. F16K 31/002
137/183

(Continued)

FOREIGN PATENT DOCUMENTS

CN 106461093 A 2/2017
CN 207089062 U 3/2018

(Continued)

OTHER PUBLICATIONS

German Office Action for Application No. 10 2018 112 089.3, dated Apr. 3, 2020 with English translation.

(Continued)

*Primary Examiner* — Michael R Reid
(74) *Attorney, Agent, or Firm* — JK Intellectual Property Law, PA

(57) ABSTRACT

An actuator for a valve element includes one base plate; one actuating element having a first end section, a second end section, and a sealing element on the first end section; one connecting element; and one SMA element having a U-shape including two parts substantially parallel to one another, a first end, a second end, and a middle section between the two parts. The actuating element is at least partially arranged on and connected to the base plate via the second end section. The connecting element is conductively connected to two points of the SMA element. A middle section of the SMA element is connected to the first end section of the actuating element so that a shortening of the SMA element causes a stroke of the sealing element.

23 Claims, 11 Drawing Sheets

(56) References Cited

U.S. PATENT DOCUMENTS

| | | | | |
|---|---|---|---|---|
| 10,107,410 B2* | 10/2018 | Dankbaar | .............. | B60N 2/914 |
| 2007/0023089 A1 | 2/2007 | Beyerlein | | |
| 2011/0227388 A1 | 9/2011 | Bocsanyi et al. | | |
| 2016/0363230 A1 | 12/2016 | Dankbaar et al. | | |
| 2019/0353268 A1* | 11/2019 | Dorfler | .................. | B60N 2/914 |

FOREIGN PATENT DOCUMENTS

| | | |
|---|---|---|
| DE | 102005060217 | 7/2006 |
| DE | 102012222570 | 6/2014 |
| DE | 11 2013 007 678 T5 | 9/2016 |
| DE | 11 2013 007 683 T5 | 12/2016 |
| DE | 10 2016 217 252 A1 | 3/2018 |
| DE | 10 2016 219 342 A1 | 4/2018 |

OTHER PUBLICATIONS

Chinese Office Action Search Report for CN Application N. 201910411575.5, dated Sep. 2, 2020 with English translation.

\* cited by examiner

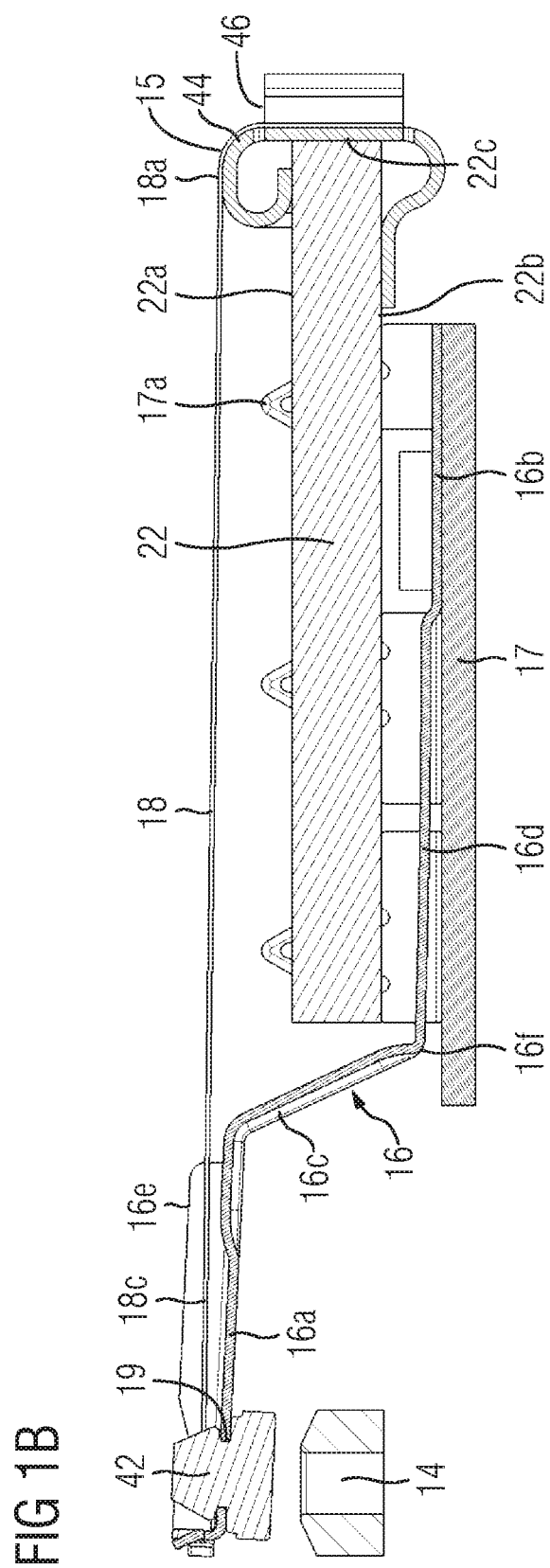

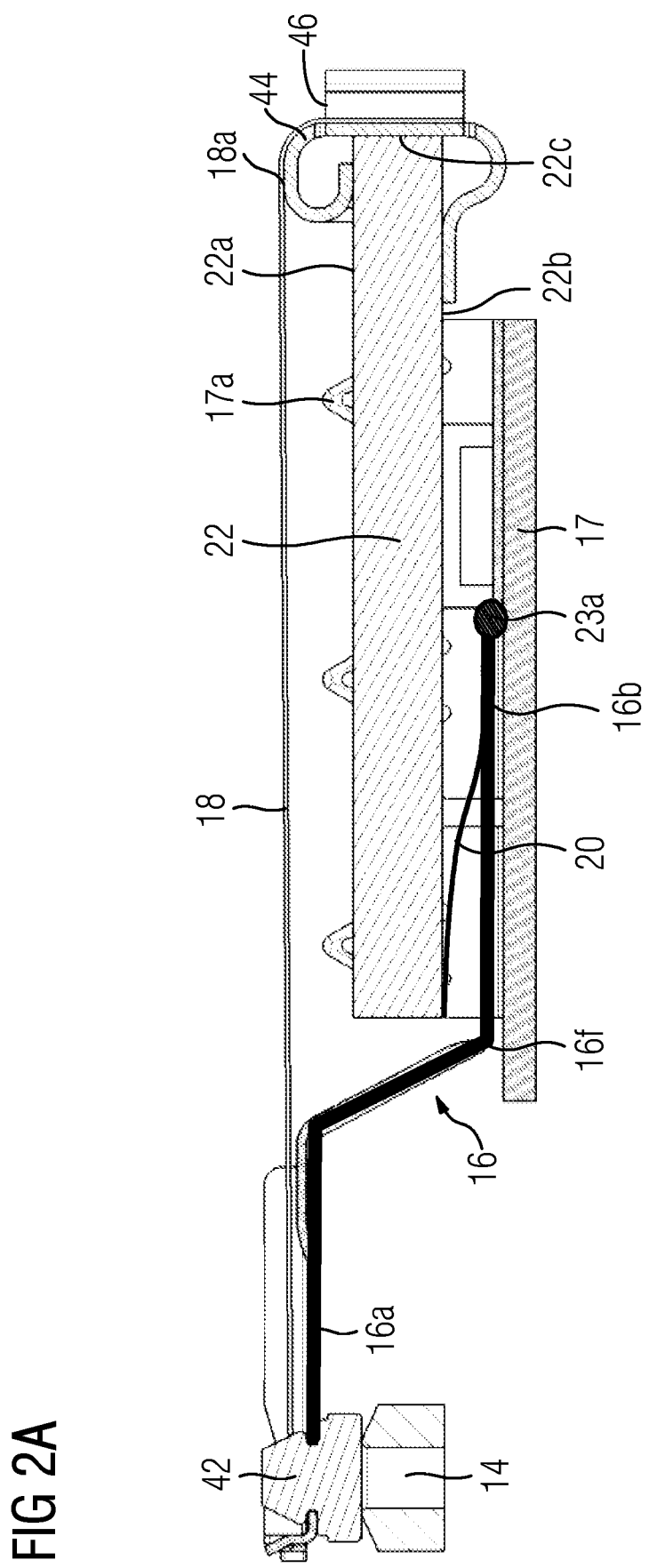

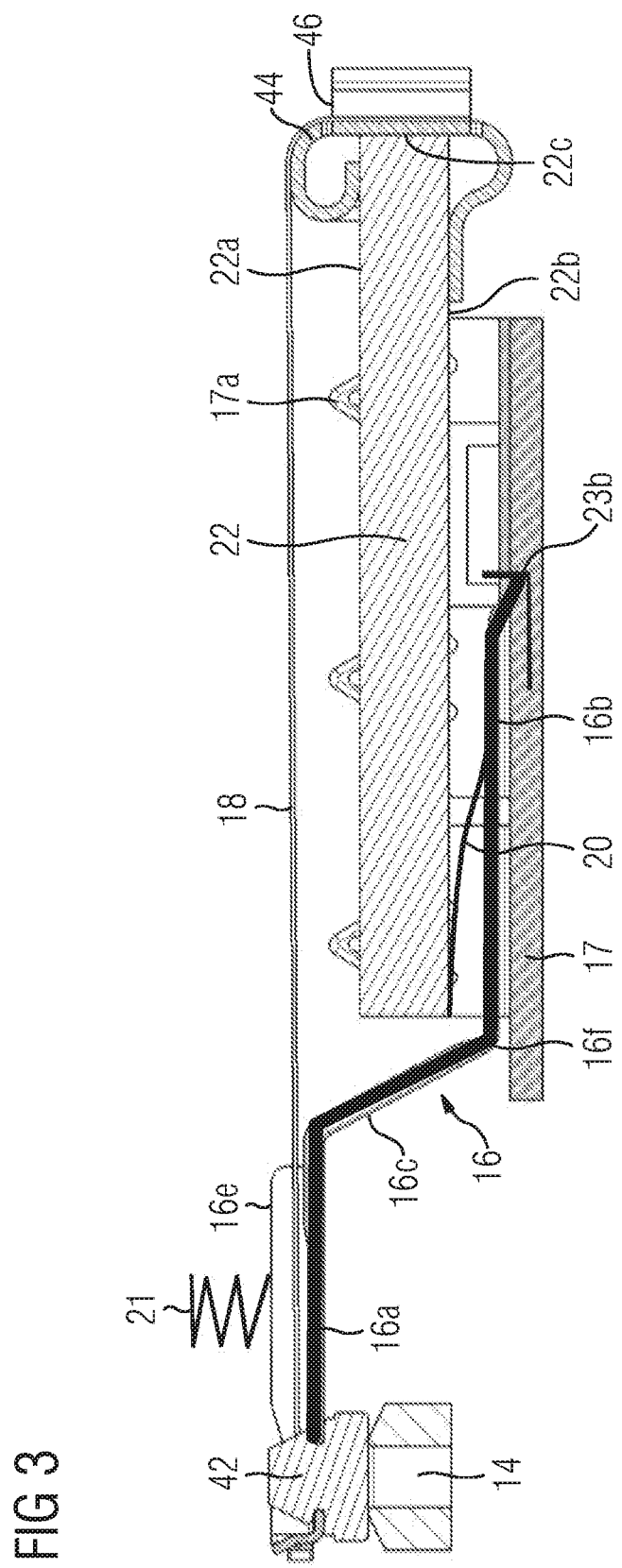

ACTUATOR FOR A PNEUMATIC VALVE, VALVE ELEMENT, VALVE ASSEMBLY AND PUMP

CROSS-REFERENCE TO RELATED APPLICATIONS

The present application claims benefit of German Application No. 10 2018 112 089.3, filed May 18, 2018, which is incorporated by reference herein.

TECHNICAL FIELD

The disclosure relates to an actuator for a pneumatic valve, a valve element with a valve housing, which encloses a valve chamber, and at least one valve opening. To actuate such a valve, an actuating element arranged inside the valve chamber is movable between a closing position to close the valve opening and an opening position to release the valve opening. Furthermore, the disclosure relates to a valve arrangement with several valve elements and a pump.

The movement of the actuating element between the opening and closing position can take place with the help of shape memory alloys (SMAs) that can have the shape of wires, for example. In this case, they are alloys that can exist in two different crystalline structures depending on their temperatures. At room temperature, a martensitic structure with a tetragonal, space-centered lattice is present, which starting at a transformation temperature of about 100° C. transforms into an austenitic structure with a cubic surface-centered lattice. Therefore, a wire made of such a shape memory alloy has the property of shortening due to the lattice transformation from a martensitic to an austenitic structure when heated up above the transformation temperature. In order to heat up the SMA element, current is usually applied to it, as a result of which it shortens and is thus able to move the actuating element.

BACKGROUND

A valve with a valve housing enclosing a pressure chamber is known, for example, from DE 10 2005 060 217, whereby a tappet is arranged inside the pressure chamber for opening and closing a valve opening. Here, an SMA element—electrically connected to a printed circuit board arranged inside the valve housing so current can be applied to it—actuates the tappet so it can move the valve opening. Since the SMA element is arranged inside the pressure chamber, it is directly exposed to the volume flow of the valve, i.e. to the air flowing in and out of the pressure chamber through the valve openings. In this case, the SMA element extends on both sides of the tappet, so that it is V-shaped.

A valve with an actuating element that includes a leaf spring is known from DE 10 2012 222 570 A1. The actuating element is actuated with an SMA element having an elongated design.

Pumps for seating comfort systems are known from US 2007/023089 or US 2016/363230A1, for example.

Such a valve or valve arrangement can be used in the area of automobile seats for filling media reservoirs, which can be fluid bubbles, especially air bubbles or air cushions. Owing to their V-shaped arrangement, these known valves are relatively large.

SUMMARY

It is therefore the task of the disclosed subject matter to specify an actuator for a valve, a valve element, a valve arrangement and a pump with such a valve arrangement, improved with regard to the aforementioned disadvantages. In particular, the actuator should have a small structural size so it can be manufactured economically.

The actuator for a valve element according to the disclosure includes a base plate, an actuating element with a sealing element on a first end section of the actuating element, a connecting element and an SMA-Element, arranged in a U-shaped way, or consisting of two parts essentially arranged parallel to one another, whereby the actuating element with the base plate is at least partially superimposed and thus attached in the area of the second end section of the actuating element, wherein the connecting element is conductively connected at two places of the SMA element, wherein the SMA element is connected in such a way to the actuating element with a middle section in the area of the first end section, especially attached in a clamping way, that a shortening of the SMA element causes a stroke of the sealing element.

The SMA element is a band- or wire-shaped element made of a shape memory alloy. Therefore, the SMA element can be either U-shaped with a U-shaped arc or consist of two parts essentially corresponding to a U-shape without a U-shaped arc. In the latter case, the middle section is understood to be a third and fourth end section, which would have been connected to the U-shaped arc in a U-shape.

To mount the SMA element, projections can be provided especially in the first section of the actuating element around which the SMA element extends, or on which the third and fourth end section are mounted.

The actuator for a valve element according to the invention has a small structural size. The actuator can be used in a modular way as assembly unit in a valve element to significantly lower the manufacturing costs for a corresponding valve element. A stroke of the sealing element caused by the shortening of the SMA element brings the actuator in an opening position. When the SMA element lengthens once again, the sealing element returns to a closing position.

In an embodiment, the actuating element is designed in a stepped way, preferably as stamped-bent part. The size of the actuator can be reduced by a step-shaped embodiment. An embodiment as stamped-bent part reduces the number of individual parts needed. The actuating element is easily and economically manufactured. Alternately or additionally, the base plate can form a stop for the actuating element, thereby limiting the downward movement of the actuating element. The stop on the base plate is advantageous, particularly when mounting the actuator assembly unit in a valve element because it simplifies in this way the arrangement of the sealing element on a valve opening.

In another embodiment, the actuating element has a passage hole, preferably in the first section, and the sealing element extends through the passage hole. Expediently, the sealing element is mounted on the passage hole in a form-fitting way. The sealing element has especially an elastic design.

In an embodiment, the connecting element includes a printed circuit board or PC board or has circuit paths attached to a plastic board or a stamped grid. In a first alternative, the SMA element is in the middle section connected to the connecting element as first contact via the actuating element, which is conductively designed, and the first and second end of the SMA element is conductively connected to a second contact of the connecting element. Furthermore, SMA elements of adjacent actuators can be executed as a one-piece SMA element. In this embodiment, a continuous ground contact can be present, also connected to numerous actuators arranged beside one another, for example. In a second alternative, the actuating element is non-conductively connected to the SMA element and each one from the first and second end of the SMA element is conductively connected in each case to a first and second contact. In this embodiment, the actuating element can be manufactured from a non-conductive material. In an arrangement of several actuators beside one another, it is possible that two SMA element ends of adjacent actuators share one contact.

Expediently, the base plate includes connectors, especially press-fit pins, soldered crimps or brackets to hold the printed circuit board in place. In this way, a printed circuit board can be easily mounted on the base plate. Preferably, the printed circuit board and the base plate are arranged on opposite sides of the actuating element.

In the embodiment, the actuating element has, in the first end, a lateral wall extending perpendicularly to the actuating element to shield the SMA element from an air current. The lateral wall is at least arranged circumferentially in sections, particularly in the first section of the actuating element.

In another embodiment, the SMA element is mounted on the printed circuit board in an area facing away from the first end section of the actuating element, especially through crimping, whereby the SMA element is preferably deflected before the mounting. In this embodiment, the traction on the fastening is reduced by the deflection of the SMA element. Moreover, the structural size can be reduced even further. A rounded surface can be provided for the deflection, so that the SMA elements are not overly stressed by a bending point.

The actuating element can preferably be designed as flexible spring attached to the base plate in a torque-proof way or alternately, the actuating element can be a lever element made of a bending-resistant material attached to the base plate so it can swivel.

In the embodiment having the actuating element as flexible spring, the flexible spring has a bending-resistant area in the first end section and an elastic area in the middle elastic area, whereby the elastic area is preferably arranged at least partially between printed circuit board and base plate and/or the elastic area is prestressed.

In the embodiment having the actuating element as lever element, the lever element is expediently reset with a spring tension, whereby preferably the spring tension is generated by a leaf spring or coil spring, which acts against the printed circuit board or the valve housing.

The valve element with a valve housing according to the invention, especially with an intermediate housing—which encloses a valve chamber—housed in the valve housing, with at least a first and a second opening, includes at least an actuator according to one of the preceding claims, whereby at least one from a first and second opening that can be closed and opened with the sealing element. The first and/or second opening constitutes a valve opening.

The valve arrangement according to the invention includes at least two valve elements executed according to the invention, whereby the valve housing enclosing in each case the valve chamber of a valve element are preferably executed as one piece.

In the embodiment, at least a first part of the at least two valve elements has a common pressure connection, which in each case ends in the valve chamber or is connected in each case to the valve chamber through at least one air channel, and/or whereby at least a second part of the several valve elements has a common opening for connection to the atmosphere.

In another embodiment, the at least two valve elements have a common pressure connection that ends in each case in the valve chamber or is connected to the valve chamber and whereby each valve element has a separate opening for connection to the atmosphere.

Expediently, the at least one air channel is formed by the intermediate housing.

Preferably, the at least two valve elements have a common printed circuit board.

In the embodiment, at least one part of the valve elements is attached to a common SMA element, whereby the SMA element is arranged in a U-shape in each one of the valve elements, and/or whereby several valve elements have at least one common second contact.

The pump for a seating comfort function according to the invention has a valve, especially a valve arrangement with one of the aforementioned embodiments. The valve element is expediently a valve with several actuators.

Expediently, the pump is housed in a housing firmly attached to a valve housing, whereby a lid of the valve housing has electrical and pneumatic connections, whereby a printed circuit board with mounted actuator assembly units is incorporated in the housing.

In the embodiment, the pump has two filling valve elements and a venting valve element, whereby the pump is especially suited for filling the lateral support bubbles of an automobile seat.

BRIEF DESCRIPTION OF THE DRAWINGS

The invention will be explained below in more detail, also with respect to additional characteristics and advantages, by describing the embodiments and with reference to the enclosed drawings, which show in each case in a schematic sketch:

FIG. 1B is a sectional view of an actuator according to a first embodiment in opening position, FIG. 2A is a sectional view of an actuator according to a second embodiment, FIG. 3 is a sectional view of an actuator according to a fourth embodiment.

DETAILED DESCRIPTION

Figure 1A:
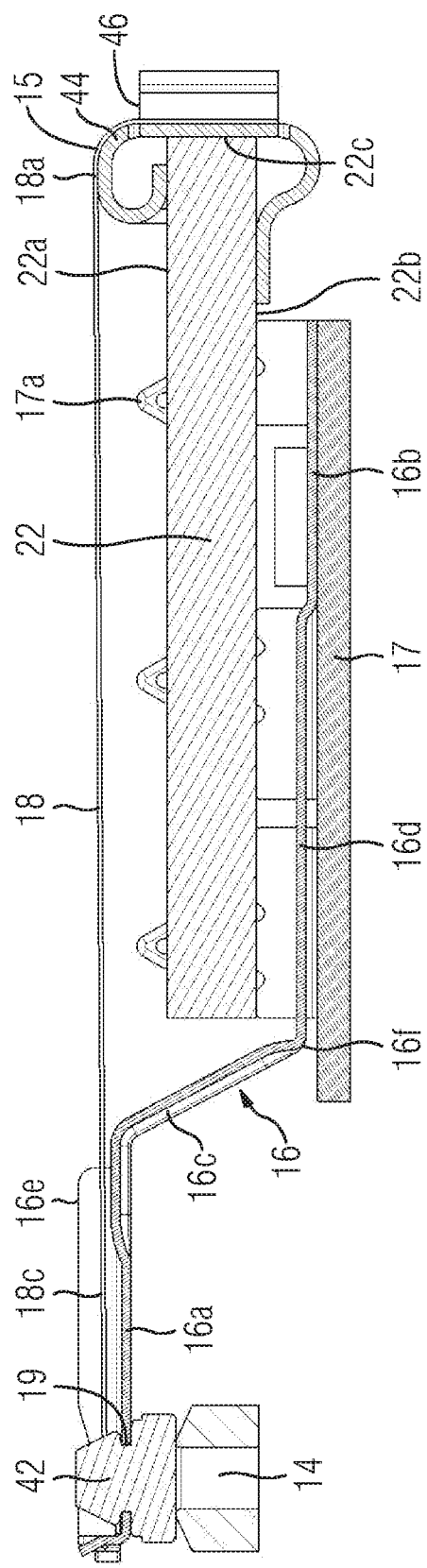
FIG. 1A is a sectional view of an actuator according to a first embodiment in closing position.

FIGS. 1A and 1B show a sectional view of an actuator according to a first embodiment. The actuator includes an actuating element 16, which is arranged on a base plate 17 and attached to it. The actuating element 16 is two-dimensionally connected to the base plate 17 on a second end section 16b.

The actuating element 16 has one first end section 16a and the second end section 16b. Between both end sections 16a and 16b extends a middle section of the actuating element 16c, in which the actuating element 16 is bent in form of a step and includes an elastic section 16d. The elastic section 16d is arranged above the base plate 17. However, the elastic section 16d and the base plate 17 have been arranged in such a way with regard to one another that the elastic section 16d can be bent. A bending of the elastic section 16d is limited by a stop of the actuating element 16 in a stopping area of the actuating element 16f. By bending the elastic section 16d and mounting on the base plate 17, a pre-stressing can be especially achieved.

A sealing element 42 for closing and releasing a valve opening 14 is arranged in the first end section of the actuating element 16a. To allow this, the first end section of the actuating element 16a has a passage hole 19, e.g. a bore hole, in which the sealing element 42 is arranged in a form-fitting way.

Furthermore, the first end section of the actuating element 16a has lateral walls 16e, which extend in sections circumferentially perpendicular from the first end section of the actuating element 16a.

The base plate 17 has connectors 17a for connecting a printed circuit board 22. The printed circuit board 22 is arranged with the connectors 17a on an opposite side of the actuating element 16. Here, the connectors 17a are designed as a press-fit pin. Hence, a top side of the printed circuit board 22a points towards the SMA element 18 while a bottom side of the printed circuit board 22b is aligned towards the base plate 17.

A bracket that includes a crimp connector 44 is arranged on a side of the printed circuit board—which is the back side 22c of the printed circuit board—that faces away from the first end section of the actuating element 16a. The crimp connector 44 has a seat 46. By means of two crimp connectors 44 arranged parallel to one another, an SMA element 18 is held on a first end 18a and a second end (not shown, adjacent end 18a). The SMA element 18 extends U-shaped from the crimp connector 44 to the first end section 16a of the actuating element 16. The SMA element 18 is attached in such a way with a middle section of the SMA element 18c to the first end section 16a that a shortening of the SMA element 18 creates a stroke of the actuating element 16 from a closing position (cf. FIG. 1A) to an opening position (FIG. 1B).

In the embodiment shown, the SMA element 18 is connected to the connecting element 15 for electrical contacting, whereby the connecting element 15 includes an area of the crimp connector and where appropriate projections of the actuating element 16g.

FIG. 2A shows a sectional view of a second embodiment of an actuator. In this embodiment, the actuating element 16 is rigidly executed. In a second end section 16b of the actuating element, the base plate 17 and the actuating element 16 are joined with a hinge 23a. The position of the hinge 23a on the base plate 17 can be arranged under or adjacent to the printed circuit board 22. If the position of the hinge 23a is adjacent to the printed circuit board 22, the actuating element 16 expediently has only one angle. The hinge 23a can be, for example, a film hinge. To reset the actuating element to a closing position, a reset actuating element 20 is provided as leaf spring in the embodiment shown, whereby the leaf spring presses against a bottom side 22b of the printed circuit board. The reset actuating element 20 can be executed as one piece with the actuating element 16. Expediently, the SMA element 18 is in this embodiment electrically connected to a first contact in the area of the crimp connector 44 with a first end 18a, and to a second contact in the area of the crimp connector 44 with a second end (not shown, adjacent end 18a).

Figure 2B:
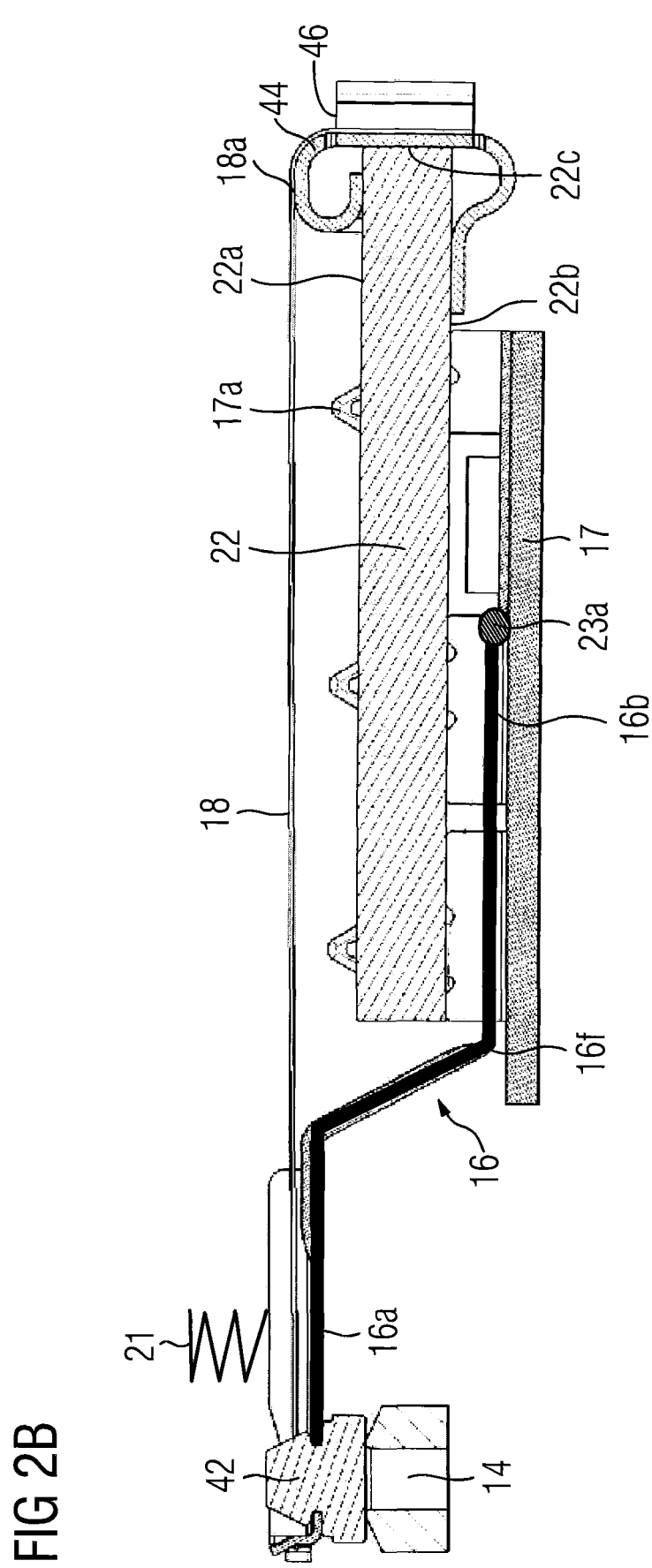
FIG. 2B is a sectional view of an actuator according to a third embodiment.

FIG. 2B shows a third embodiment of the actuator. In the third embodiment, the reset actuating element 20 has been replaced by a reset actuating element 21. The reset actuating element 21 is designed as a spiral spring, which expediently acts against a valve housing wall. Alternative positions or spring designs are possible to reset the actuating element.

FIG. 3 shows a sectional view of the fourth embodiment of an actuator. The fourth embodiment differs from the second embodiment in that the actuating element 16 is connected to the base plate through a bearing 23b in a second end section 16b. The bearing 23b can be especially designed as angle or notch, in which the second end section 16b of the actuating element is received, whereby—as in the second embodiment—the length of the second end section of the actuating element and thus the position of the bearing 23b along the base plate 17 can have a different design. In the fourth embodiment, either a reset actuating element 20 or a reset actuating element 21 is provided.

Figure 4:
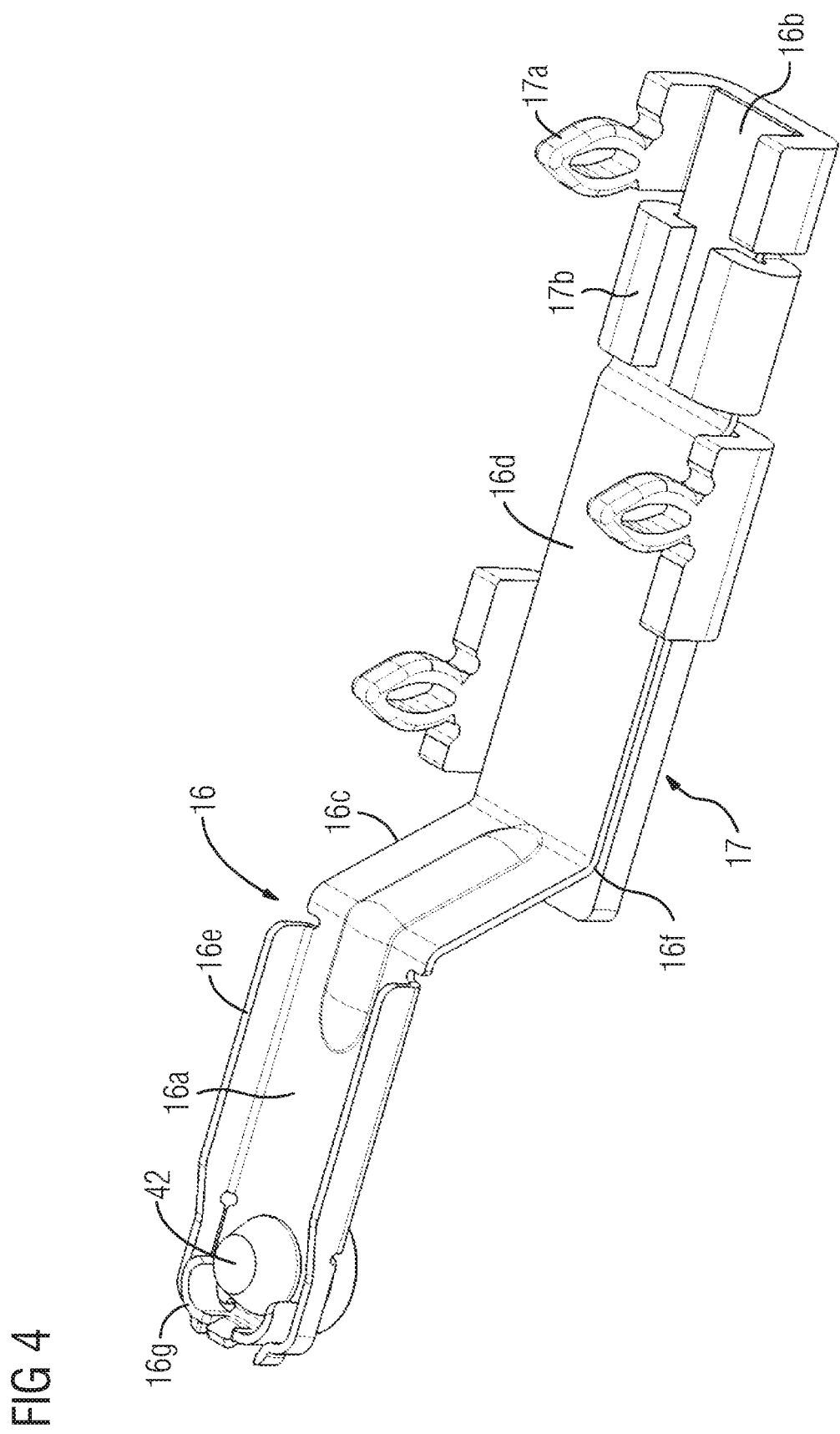
FIG. 4 is an isometric view of an actuating element with base plate in a fifth embodiment.

FIG. 4 shows a view of the fifth embodiment of the actuating element 16 with a base plate 17. The actuating element 16 is a stamped-bent part designed in form of a step. The base plate 17 has connectors 17a in form of press-fit pins. Moreover, the base plate 17 also has a clamping device to clamp down and hold the actuating element 16.

The actuating element 16 has a second end section 16b connected in a clamping way to the clamping device 17b of the base plate 17. An elastic area 16d joins the second end section 16b. The elastic area 16d superimposes the base plate 17 and has the stopping area 16f in an area facing away from the second end section 16b. The stopping area 16f is arranged on a first edge of the actuating element 16. The middle area of the actuating element 16c can include a reinforcement rib in a central area.

The sealing element 42 is arranged in the first end section of the actuating element 16a. Lateral walls 16e of the actuating element 16 are arranged in sections circumferentially around the first end section of the actuating element 16a. The lateral walls 16e of the actuating element are executed as one piece together with the actuating element 16 and extend perpendicularly from the first end section of the actuating element 16a.

Furthermore, in the first end section of the actuating element 16a, the actuating element 16 has been provided with projections 16g around which a middle section of the SMA element 18c (not show) is pre-stressed, or on which a third and fourth end section of the SMA element is mounted.

Figure 5:
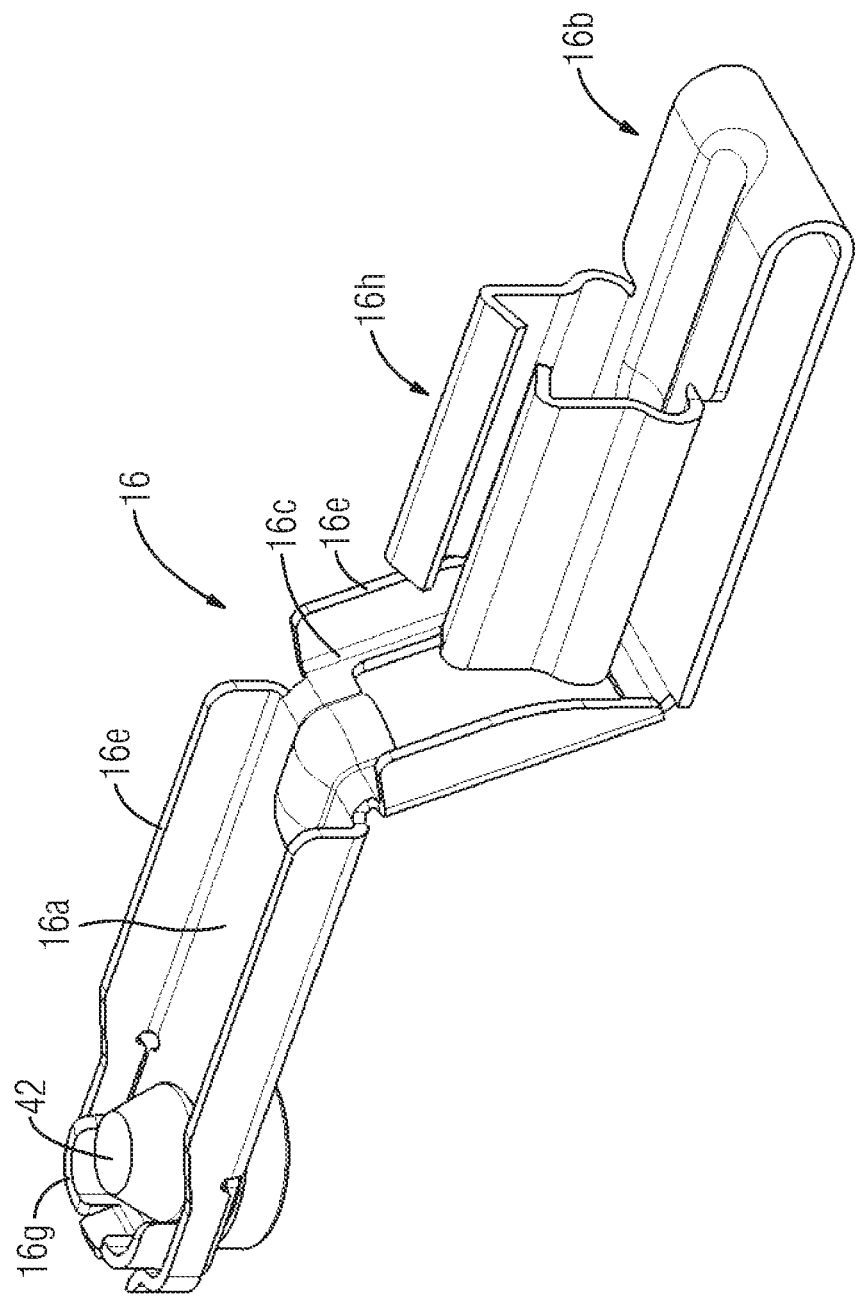
FIG. 5 is an isometric view of an actuating element in a sixth embodiment.

FIG. 5 shows a sixth embodiment of the actuating element 16. In a modification of the fifth embodiment, the actuating element 16 has lateral walls 16e arranged in the middle section of the actuating element 16c too so the actuating element 16 can be stiffened.

Furthermore, the second end section 16b of the actuating element 16b is bent in a U-shape and has a clamping device 16h for receiving a printed circuit board 22.

Figure 6:
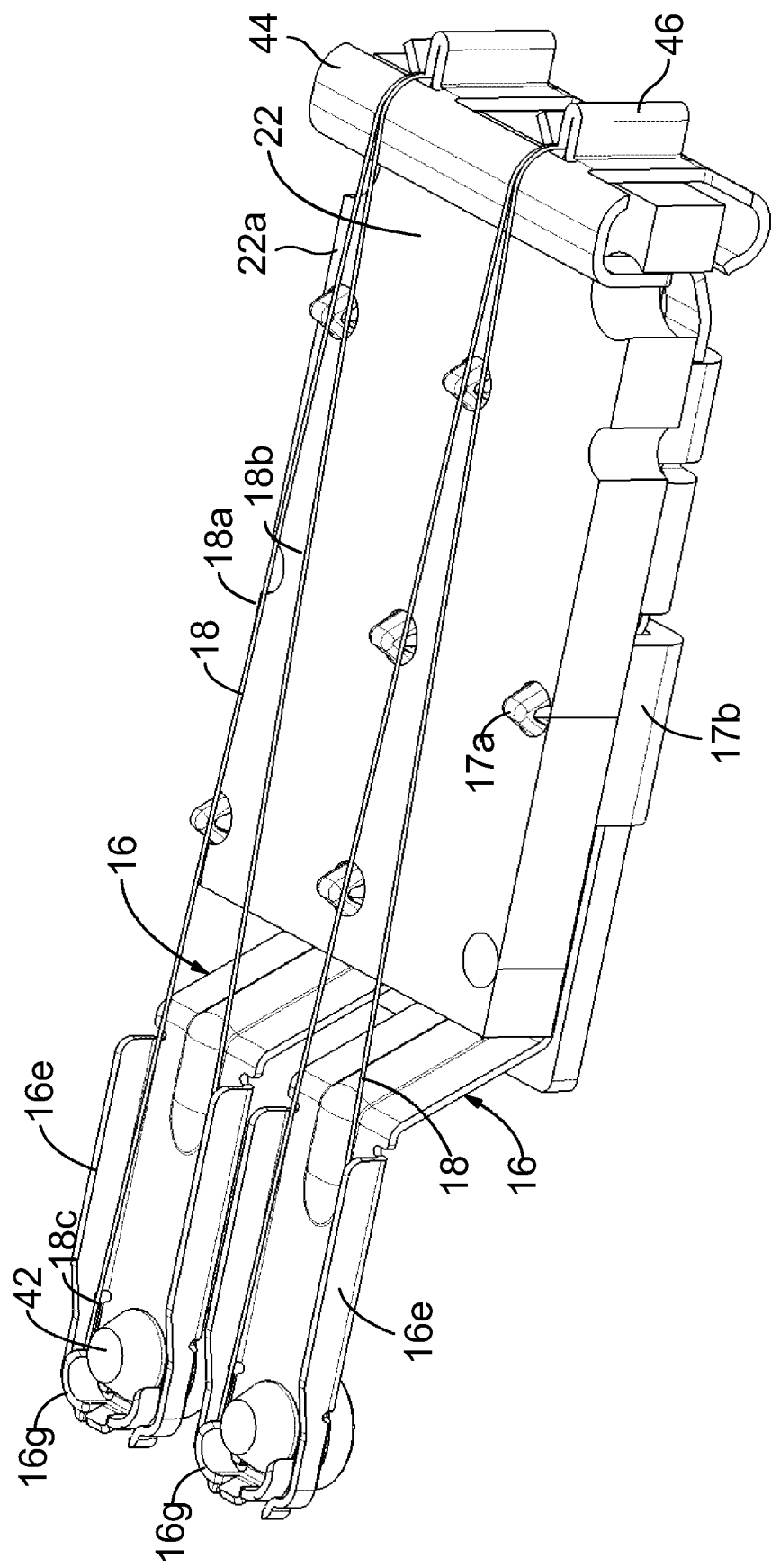
FIG. 6 is an isometric view of two actuators with a common printed circuit board.

FIG. 6 shows an arrangement of two actuating elements 16 on a common base plate 17 with a common printed circuit board 22. The printed circuit board is mounted on the base plate 17 with connectors 17a. In the embodiment shown, the first and second end of the SMA element 18a, 18b is incorporated in a joint seat 46 of a crimp connector 44. The first and second end of the SMA elements 18*a*, 18*b* are bent by about 90° over a rounded surface of the crimp connector 44 with regard to the seat 46.

Figure 7:
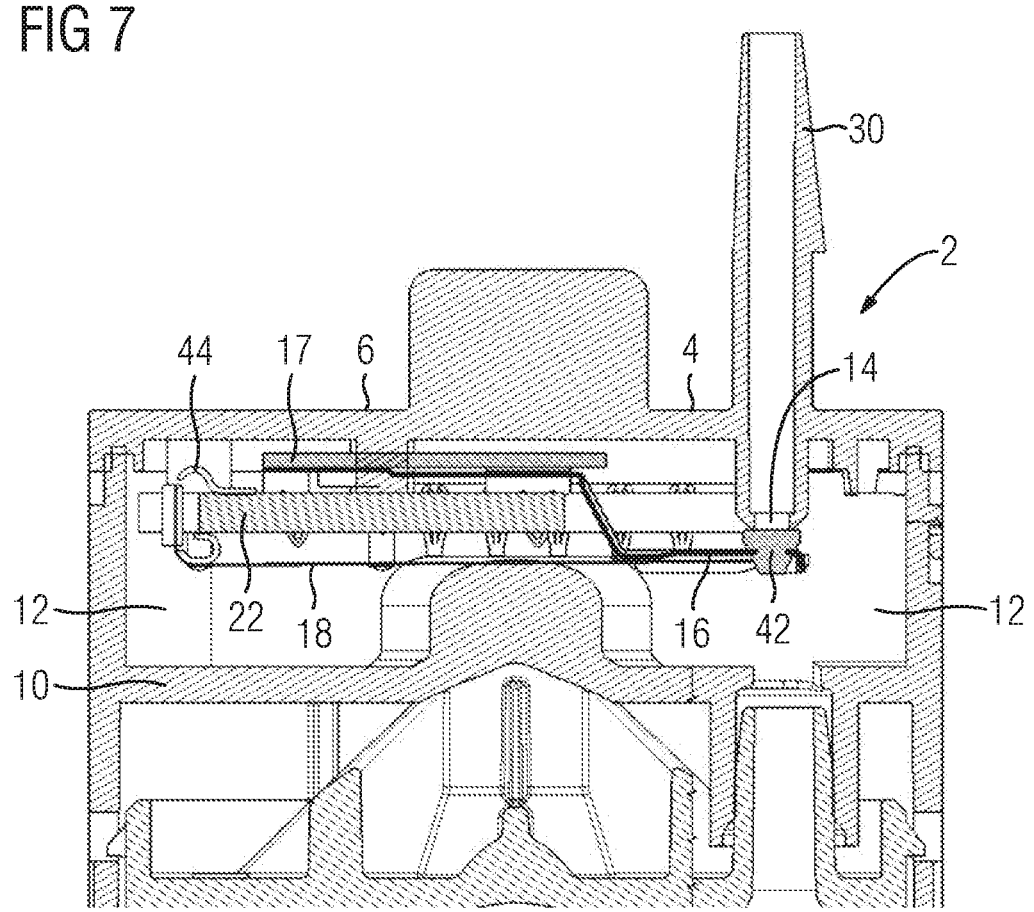
FIG. 7 is a sectional view of the valve element of the first embodiment with an actuator for filling a lateral support bubble.

FIG. 7 shows a valve element 2 with an actuator of the first embodiment for filling a lateral support bubble. The valve element 2 includes a housing 4 with a housing lid 6 and a housing bottom 8. In the housing, an actuator with an actuating element 16 and a base plate 17 are incorporated. The actuating element 16 includes a sealing element 42 with which a valve opening 14 can be opened and closed. A consumer connection 30 is fluidically connected to the valve opening 14. Expediently, the consumer connection 30 tapers in an end section.

Figure 8:
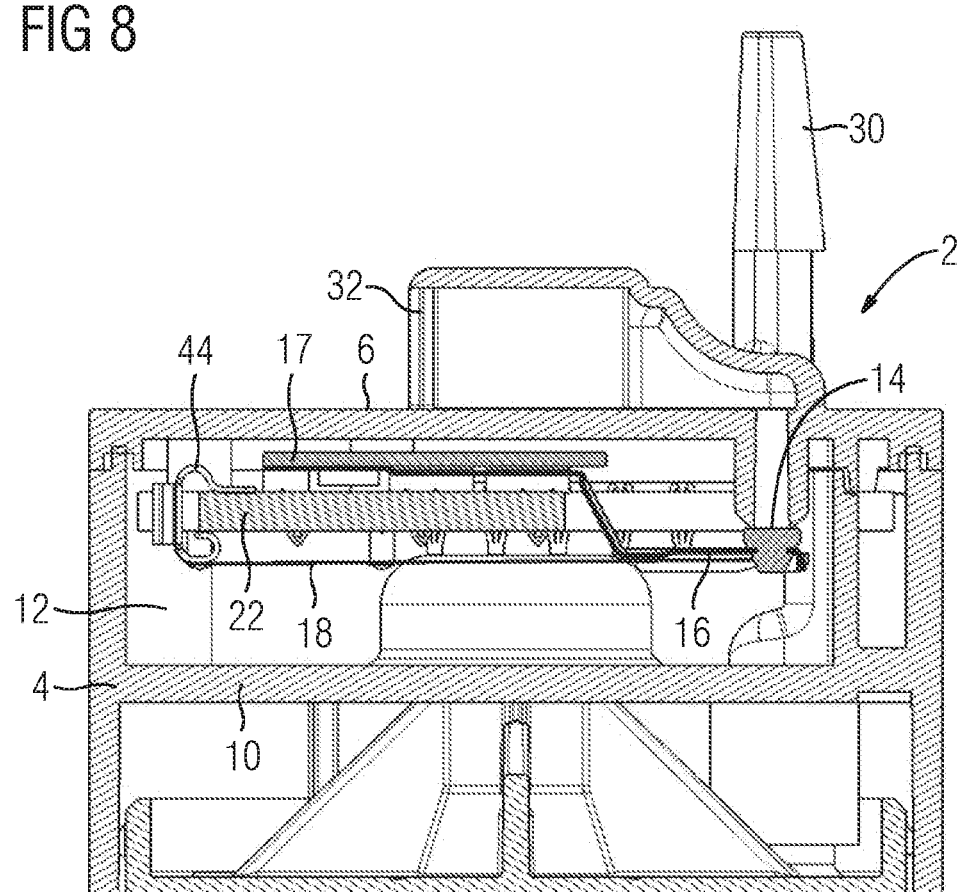
FIG. 8 is a sectional view of the valve element of the second embodiment with an actuator for venting a lateral support bubble.

FIG. 8 shows a valve element with an actuator of the second embodiment for venting a lateral support bubble. The valve element for venting has essentially the same design as the valve element shown in FIG. 7 to fill a lateral bubble. Instead of the consumer connection 30, it is connected to the atmosphere through an opening 32. A noise-reducing device, especially a foam, can be arranged between the valve opening 14 and the opening 32.

Figure 9:
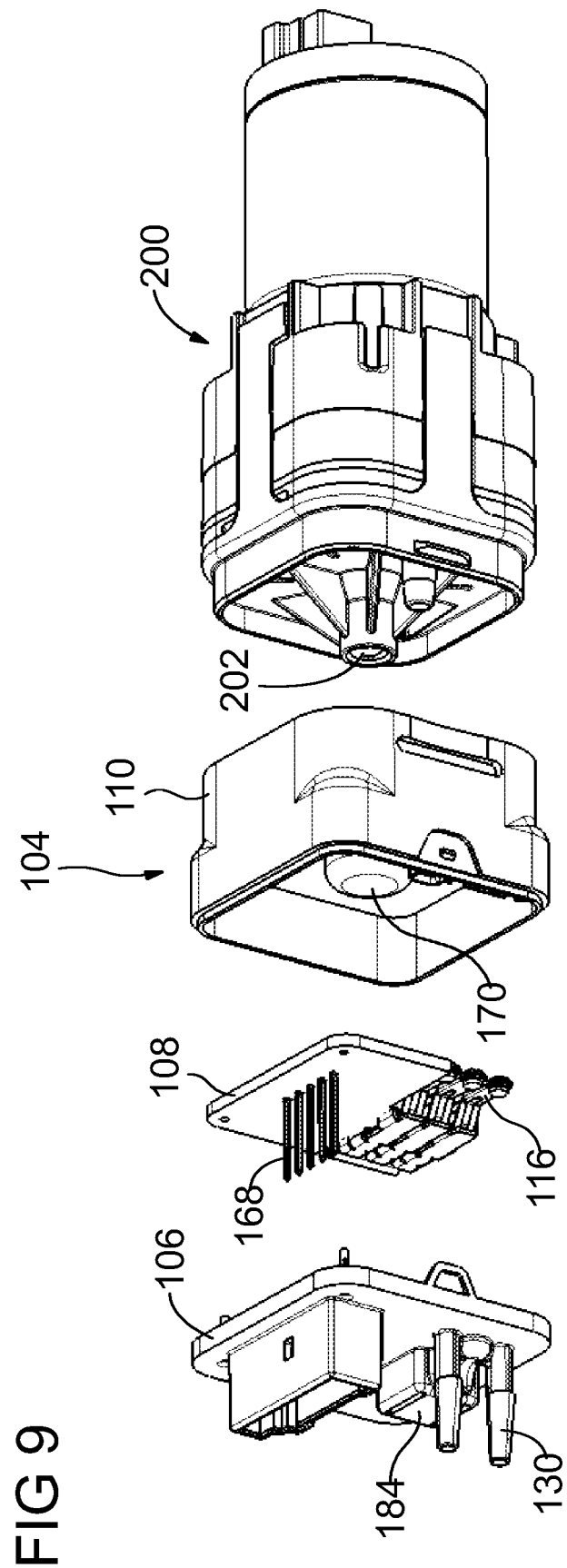
FIG. 9 is an exploded isometric view of a pump for lateral support bubbles.

The valve elements shown in FIGS. 7 and 8 to fill and vent a lateral support bubble of a seating comfort system are, for example, incorporated in a pump device as in FIG. 9. An exploded view drawing in FIG. 9 shows such a pump device. The pump device includes a pump 200 with a housing and a pressurized air outlet 202, which is connected to a housing bottom 110 of a valve housing 104. The valve housing 104 is fluidically connected with a pressure connection 170 to the pressurized air outlet 202 through the housing bottom 110.

An intermediate housing 110 that includes the printed circuit board 122 and three actuating elements 116 has been incorporated in the valve housing 104. Plug connectors 168 extend from the intermediate housing 110 through the housing lid 106. The housing lid 106 includes two consumer connections 130 and a venting area 184. The venting area 184 can be provided with damping foam 174 (not shown). The middle actuating element 116 is part of a venting valve element 180, as shown in FIG. 8, and each one of the two external actuating elements 116 are part of a filling valve, as shown in FIG. 7.

To fill the lateral support bubbles, air is introduced through the pump in the valve housing and the two filling valve elements are simultaneously opened. To vent the sides, both lateral support bubbles and the venting valve element are opened at the same time, so that air from the lateral support bubbles can flow back to the valve housing filling valve elements and then released into the atmosphere through the venting valve element.

LIST OF REFERENCE CHARACTERS

2 Valve
4 Valve housing
6 Housing lid
8 Intermediate housing
10 Housing bottom
12 Valve chamber
14 Valve opening
15 Connecting element
16 Actuating element
16*a* First end section of the actuating element
16*b* Second end section of the actuating element
16*c* Middle section of the actuating element
16*d* Elastic section of the actuating element
16*e* Lateral walls of the actuating element
16*f* Stopping area of the actuating element
16*g* Projection
16*h* Clamping device
17 Base plate
17*a* Connectors
17*b* Clamping device
18 SMA element
18*a* First end of the SMA element
18*b* Second end of the SMA element
18*c* Middle section of the SMA element
19 Passage hole
20 First reset actuating element
21 Second reset actuating element
22 Printed circuit board
22*a* Top side of the printed circuit board
22*b* Bottom side of the printed circuit board
22*c* Back side of the printed circuit board
23*a* Hinge
23*b* Bearing
28 Separating wall
30, 130 Consumer connection
30*a*, 30*b* End sections of the consumer connection
32 Opening
42 Sealing element
44 Crimp connectors
46 Seat of the crimp connector
100 Valve arrangement
106 Housing lid
108 Intermediate housing
110 Housing bottom
116 Actuating elements
122 Printed circuit board
168 Plug connectors
170 Pressure connector
174 Damping foam
182 Pressure area
184 Venting area
200 Pump
202 Pressurized air outlet

The invention claimed is:

1. An actuator for a valve element comprising:
one base plate;
one actuating element having a first end section, a second end section, and a sealing element on the first end section;
one connecting element; and
one SMA element having a U-shape including two parts substantially parallel to one another, a first end, a second end, and a middle section between the two parts;
wherein the actuating element is at least partially arranged on and connected to the base plate via the second end section;
wherein the connecting element is conductively connected to two points of the SMA element; and
wherein the middle section of the SMA element is connected to the first end section of the actuating element so that a shortening of the SMA element causes a stroke of the sealing element.

2. The actuator according to claim 1, wherein the actuating element includes a stepped configuration, and wherein the base plate includes a stop for contacting the actuating element.

3. The actuator according to claim 1, wherein the base plate includes a stop for contacting the actuating element.

4. The actuator according to claim 1, wherein the actuating element defines a passage hole in the first end section, and the sealing element extends through and is attached within the passage hole via a form-fit.

5. The actuator according to claim 1, wherein the connecting element includes a printed circuit board, and wherein one of:
the middle section of the SMA element is connected to the connecting element as a first contact via the actuating element, the actuating element being conductive, and the first end and the second end of the SMA element being conductively connected as a second contact of the connecting element; and
the actuating element is not conductively connected to the SMA element and the first end and the second end of the SMA element are conductively connected respectively as a first contact and a second contact.

6. The actuator according to claim 5, wherein the base plate includes connectors to fix the printed circuit board in place.

7. The actuator according to claim 6, wherein the printed circuit board and the base plate are arranged on opposite sides of the actuating element.

8. The actuator according to claim 1, wherein the actuating element has a lateral wall extending perpendicularly to a longitudinal axis of the actuating element in the first end shielding the SMA element from an air current.

9. The actuator according to claim 1, wherein the SMA element is mounted on the printed circuit board in an area facing away from the first end of the actuating element, and wherein the SMA element is mounted in a pre-deflected condition.

10. The actuator according to claim 1, wherein the actuating element includes a flexible spring attached in a torque-proof way to the base plate.

11. The actuator according to claim 10, wherein the flexible spring includes a bending-resistant area and a middle elastic area in a first end and wherein at least one of: (a) the middle elastic area is arranged at least partially between the printed circuit board and the base plate, and (b) the middle elastic area is pre-stressed.

12. A valve element with a valve housing having an intermediate housing enclosing a valve chamber, at least a first opening and a second opening, and having at least one actuator according to claim 1 wherein at least one of the first opening and the second opening can be opened and closed as a valve opening via the sealing element.

13. A valve arrangement with at least two of the valve elements according to claim 12, wherein the valve housings enclosing the respective valve chambers are formed as one unitary valve housing.

14. The valve arrangement according to claim 13, wherein at least a first part of the at least two valve elements has a common pressure connection that one of: ends in in the valve chamber, is connected to the valve chamber via at least one air channel, and wherein at least one second part of the valve elements has a common opening for connection to the atmosphere.

15. The valve arrangement according to claim 13, wherein the at least two valve elements have a common pressure connection ending in the valve chamber or connected to the valve chamber, and wherein each valve element has a separate opening for connection to the atmosphere.

16. The valve arrangement according to claim 14, wherein the at least one air channel is formed from the intermediate housing.

17. The valve arrangement according to claim 13, wherein the at least two valve elements have a common printed circuit board.

18. The valve arrangement according to claim 13, wherein at least one of: (a) the SMA elements of at least two of the valve elements are configured as a common SMA element, and (b) several of the valve elements have at least one common second contact.

19. A pump device for a seating comfort function having a valve arrangement according to claim 13 and a pump.

20. The pump device according to claim 19, wherein the pump is incorporated in a housing attached to the valve housing, wherein a housing lid of the valve housing has electrical and pneumatic connections, and wherein a printed circuit board with mounted actuator assembly units is housed in the housing.

21. The pump device according to claim 19, further including two filling valve elements and one venting valve element, the pump device being configured for filling lateral support bubbles of an automobile seat.

22. The actuator according to claim 1, wherein the actuating element includes a lever element made of a bending-resistant material swivelably attached to the base plate.

23. The actuator according to claim 22, wherein the lever element is reset with a spring tension, wherein the spring tension is generated by a reset actuating element including a spring acting against one of the printed circuit board of a valve housing.

* * * * *

Disclaimer

11,073,219 B2 - Erich Dörfler, Landsberg (DE); Ronny Gehlmann, Allersberg (DE); Helmut Auernhammer, Hôttingen (DE); Matthias Mitzler, Graben (DE). ACTUATOR FOR A PNEUMATIC VALVE, VALVE ELEMENT, VALVE ASSEMBLY AND PUMP. Patent dated July 27, 2021. Disclaimer filed November 8, 2022, by the assignee, Alfmeier Präzision SE.

I hereby disclaim the following complete claims 1-3, 5, 6, 9, 12-17, 19 and 21 of said patent.

*(Official Gazette, March 14, 2023)*